(12) United States Patent  (10) Patent No.: US 8,994,678 B2
Sawhney et al.  (45) Date of Patent: Mar. 31, 2015

(54) TECHNIQUES FOR PROGRAMMABLE BUTTON ON BEZEL OF MOBILE TERMINAL

(75) Inventors: Parvinder Sawhney, Fremont, CA (US); Peter King, San Mateo, CA (US); Hyoung Wook Ham, San Ramon, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 13/552,336

(22) Filed: Jul. 18, 2012

(65) Prior Publication Data

US 2014/0022182 A1  Jan. 23, 2014

(51) Int. Cl.
G09G 5/00 (2006.01)
G06F 3/0486 (2013.01)
G06F 3/0488 (2013.01)

(52) U.S. Cl.
CPC ............ G06F 3/0488 (2013.01); G06F 3/0486 (2013.01)
USPC ................ 345/173; 345/1; 345/156; 715/769

(58) Field of Classification Search
USPC ...................... 345/1, 173–178, 156, 157, 169; 178/18.01–18.06; 175/769; 715/769
See application file for complete search history.

(56) References Cited

U.S. PATENT DOCUMENTS

| | | | |
|---|---|---|---|
| 6,289,466 B1 | 9/2001 | Bayramoglu et al. | |
| 7,656,393 B2 | 2/2010 | King et al. | |
| 2003/0221877 A1 | 12/2003 | Harrison | |
| 2009/0289874 A1* | 11/2009 | Ha | 345/1.3 |
| 2011/0047494 A1* | 2/2011 | Chaine et al. | 715/769 |
| 2011/0080348 A1 | 4/2011 | Lin et al. | |
| 2011/0102354 A1* | 5/2011 | Fuyuno et al. | 345/173 |
| 2011/0205163 A1* | 8/2011 | Hinckley et al. | 345/173 |
| 2013/0044075 A1* | 2/2013 | Utsugi et al. | 345/174 |

OTHER PUBLICATIONS

John Brownlee, "New iPad Patents Show Off Dual Dock Connectors and Smart Bezel Button," cultofmac.com, Sep. 27, 2010, http://www.cultofmac.com/60729/new-ipad-patents-show-off-dual-dock-connectors-and-smart-bezel-button/.

Jack Purcher, "Apple's iPad May Gain an Intelligent Bezel in the Future," patentlyapple.com, Feb. 2, 2010, http://www.patentlyapple.com/patently-apple/2010/02/apples-ipad-may-gain-an-intelligent-bezel-in-the-future.html.

Jack Purcher, "Apple Blows us Away with Smart Bezel Details!," patentlyapple.com, Apr. 7, 2011, http://www.patentlyapple.com/patently-apple/2011/04/apple-blows-us-away-with-smart-bezel-details.html.

* cited by examiner

Primary Examiner — Jennifer Nguyen
(74) Attorney, Agent, or Firm — Jefferson IP Law, LLP

(57) ABSTRACT

A terminal and a method for a programmable button on a bezel of the terminal are provided. For a mobile terminal comprising a touch sensor, a first display and at least one second display disposed at the bezel, the bezel at least partially surrounding the first display, the method includes mapping an object displayed on the first display to a button on the at least one second display, displaying the button on the at least one second display, and when the displayed button is actuated, performing an action corresponding to the object.

23 Claims, 5 Drawing Sheets

TECHNIQUES FOR PROGRAMMABLE BUTTON ON BEZEL OF MOBILE TERMINAL

BACKGROUND OF THE INVENTION

1. Field of the Invention

Aspects of the present invention relate to techniques for a mobile terminal. More particularly, aspects of the present invention relate to techniques for a programmable button on a bezel of the mobile terminal 2. Description of the Related Art Mobile terminals may be constructed to perform various functions. Examples of various functions include establishing data/voice communication, capturing a photo or a motion picture by using a camera, storing a voice signal, reproducing a music file by using a speaker system, displaying an image or video, and so on.

Some mobile terminals may further include a function of playing games and some mobile terminals may be embodied as multimedia devices. Furthermore, mobile terminals that have recently been developed are capable of receiving a broadcast or multicast signal to allow a user to view video or a television program.

As the number of functions and capabilities of mobile terminals increases, there is an increasing desire to increase the size of a display screen of the mobile terminals. However, the increase of the size of the display screen is limited by the need for user input. For example, mobile terminals may use a key pad to enable user input. In order to address the need for increased screen sizes while retaining the ability for user input, touch screens have been employed in mobile terminals.

The above information is presented as background information only to assist with an understanding of the present disclosure. No determination has been made, and no assertion is made, as to whether any of the above might be applicable as Prior Art with regard to the present invention.

SUMMARY OF THE INVENTION

An aspect of the present invention is to address at least the above-mentioned problems and/or disadvantages and to provide at least the advantages described below. Accordingly, an aspect of the present invention is to provide techniques for a programmable button on a bezel of a mobile terminal.

In accordance with an aspect of the present invention, a method for a programmable button on a bezel of a mobile terminal, the mobile terminal comprising a touch sensor, a first display and at least one second display disposed at the bezel, the bezel at least partially surrounding the first display, is provided. The method includes mapping an object displayed on the first display to a button on the at least one second display, displaying the button on the at least one second display, and when the displayed button is actuated, performing an action corresponding to the object.

In accordance with another aspect of the present invention, a mobile terminal is provided. The terminal includes a touch sensor for detecting a touch, a first display for displaying an object, at least one second display disposed at a bezel, the bezel at least partially surrounding the first display, and at least one controller for controlling the touch sensor, the first display and the at least one second display, for mapping the object displayed on the first display to a button on the at least one second display, for controlling to display the button on the at least one second display, and for, when the displayed button is actuated, performing an action corresponding to the object.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
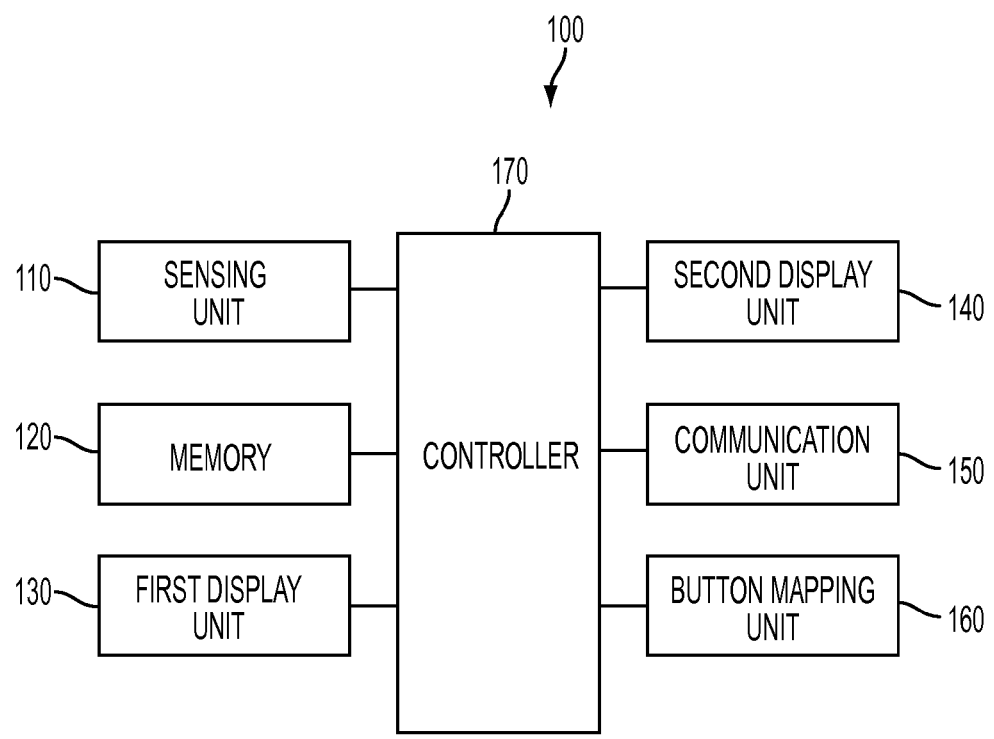
FIG. 1 is a block diagram of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

First, the terms used in the present disclosure will be briefly described below before exemplary embodiments of the present invention are described in greater detail.

Most of the terms used herein are general terms that have been widely used in the technical art to which the present disclosure pertains. However, some of the terms used herein may have been created to reflect the intentions of technicians in this art, precedents, or new technologies. Also, some of the terms used herein may have been arbitrarily chosen. In this case, these terms are defined in detail below. Accordingly, the specific terms used herein should be understood based on the unique meanings thereof and the whole context of the present disclosure.

In the present disclosure, it should be understood that the terms, such as 'include' or 'have,' etc., are intended to indicate the existence of the features, numbers, steps, actions, components, parts, or combinations thereof disclosed in the present disclosure, and are not intended to preclude the possibility that one or more other features, numbers, steps, actions, components, parts, or combinations thereof may exist or may be added. Also, the terms, such as 'unit' or 'module', etc., should be understood as a unit that processes at least one function or operation and that may be embodied in a hardware manner, or a combination of the hardware manner and a software manner.

It is to be understood that the singular forms "a," "an," and "the" include plural referents unless the context clearly dictates otherwise. Thus, for example, reference to "a component surface" includes reference to one or more of such surfaces.

As used herein, the term "and/or" includes any and all combinations of one or more of the associated listed items. Expressions such as "at least one of," when preceding a list of elements, modify the entire list of elements and do not modify the individual elements of the list.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of term "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

As used herein, the terms "first", "second", and the like are used to differentiate between objects having the same terminology and are in no way intended to represent a chronological order, unless where explicitly stated otherwise. Also, a "set" is defined as a non-empty set including at least one element.

Throughout the present disclosure, the term 'object' means anything that a user can select in a User Interface (UI) and/or a Graphical User Interface (GUI). For convenience in explanation, the UI and/or GUI will collectively be referred to as the GUI. Examples of an object may include an icon, a link, a picture, a text, an index item, and so on. The term 'page' means a space containing content, information, or an object. For example, a page may be a web page, a list of contents, a list of thumbnails, a tray of photographs, a tray of icons, and so on.

Throughout the present disclosure, the term 'gesture' means, for example, a movement of a hand of a user to control a mobile terminal Examples of a gesture described herein include tapping, touching and holding, double-tapping, dragging, panning, flicking, dragging and dropping, and so on.

The term 'tapping' may be understood as a user touching a screen with a finger or a stylus at very high speeds. In other words, the term 'tapping' means a case where a time period between when touch-in is done and when touch-out is done is very short. Touch-in means a user touching a screen with a finger or a stylus and touch-out means taking the finger or the stylus off from the screen.

The term 'touching and holding' means a user touching a screen with a finger or a stylus and maintaining the touching for a threshold period of time or longer. That is, the term 'touching and holding' means a case where a time period between when touch-in is done and when touch-out is done is equal to or greater than the threshold period of time. If a touch input is maintained for a threshold period of time or longer, a video or audio feedback signal may be provided to the user so that the user may determine whether the touch input is a tapping operation or a touch-and-hold operation.

The term 'double-tapping' means a user touching a screen twice at high speeds by using a finger or a stylus.

The term 'dragging' means a user touching a point on a screen with a finger or a stylus and moving the finger or the stylus to another point on the screen while maintaining the touching. Dragging may be done to move an object or perform panning.

The term 'panning' means performing dragging without selecting an object. Since no object is selected while panning is done, panning is performed to move a page within a screen or move an object group within a page, rather than to move an object within a page.

The term 'flicking' means a user performing dragging at high speeds by using a finger or a stylus. Dragging (or panning) and flicking may be differentiated from each other, based on whether a moving speed of the finger or the stylus is equal to or greater than a threshold speed.

The term 'dragging and dropping' means a user dragging an object to a desired location on a screen by using a finger or a stylus and then taking the finger or the stylus off from the screen so as to drop the object at a location corresponding to where the finger or stylus is taken off the screen.

Hereinafter, exemplary embodiments of the present invention will be described in greater detail with reference to the accompanying drawings so that those of ordinary skill in the art can easily accomplish embodiments of the present invention. The present invention may, however, be embodied in many different forms and should not be construed as being limited to the exemplary embodiments set forth herein. In the following description, well-known functions or constructions are not described in detail if it is determined that they would obscure the invention due to unnecessary detail. Throughout the drawings, whenever the same element reappears in a subsequent drawing, it is denoted by the same reference numeral.

Exemplary embodiments of the present invention described below relate to techniques for a mobile terminal. More particularly, exemplary embodiments of the present invention relate to relate to techniques for a programmable button on a bezel of the mobile terminal.

An example of the mobile terminal for the technique for a programmable button on a bezel thereof is described below with reference to FIG. 1.

FIG. 1 is a block diagram of a mobile terminal according to an exemplary embodiment of the present invention.

The mobile terminal 100 may be embodied in any of various shapes. Examples of the mobile terminal 100 may include a mobile phone, a smartphone, a tablet computer, a laptop computer, a notebook computer, a digital broadcasting terminal, a Personal Digital Assistant (PDA), a Portable Multimedia Player (PMP), a navigation device, a monitor, a TeleVision (TV), a digital Consumer Electronics (CE) device, a Digital TeleVision (DTV), an Internet Protocol TV (IPTV), a refrigerator with a display device, an air conditioner with a display device, a printer with a display device, and so on.

Referring to FIG. 1, the mobile terminal 100 may include a sensing unit 110, a memory 120, a first display unit 130, a second display unit 140, a communication unit 150, a button mapping unit 160, and a controller 170, but the present invention is not limited thereto. The mobile terminal 100 may further include other elements or may include less than all of the elements illustrated in FIG. 1. In addition, one or more of the elements illustrated in FIG. 1 may be combined into a single element, and any of the elements illustrated in FIG. 1 may be separated into a plurality of elements. Furthermore, the mobile terminal 100 may include more than one of any of the elements illustrated in FIG. 1. The elements of the mobile terminal 100 illustrated in FIG. 1 will now be described.

The sensing unit 110 senses a current state of the mobile terminal 100, e.g., the location of the mobile terminal 100, whether a user touches the mobile terminal 100 or not, the orientation of the mobile terminal 100, and acceleration/deceleration of the mobile terminal 100, and then generates a sensing signal for controlling an operation of the mobile terminal 100.

The sensing unit 110 may include or function as a user input unit for generating input data to control an operation of the mobile terminal 100. In this case, the sensing unit 110 may include a keypad, a dome switch, a touch pad, e.g., a constant pressure type/capacitive type touch pad, a jog wheel, a jog switch, HardWare (H/W) buttons, and so on. In particular, if the touch pad forms a layered structure together with the first display unit 130 and/or second display unit 140, then the touch pad may be referred to as a touch screen.

According to an exemplary embodiment of the present invention, the sensing unit 110 may include any of various sensors to sense a touch on or near the touch screen, i.e., a real-touch or a proximity-touch. A tactile sensor is a type of sensor that senses a touch on or near a touch screen. The tactile sensor may sense a touch on a screen to a same degree or more precisely than the degree to which a human being can sense the touch. The tactile sensor is capable of sensing various information, e.g., the toughness of a contact surface, the hardness of an object to be touched, and the temperature of a point to be touched.

A proximity sensor is another example of a sensor that senses a touch near a touch screen.

The proximity sensor is a sensor that senses the presence of an object, which is accessing or is located near a predetermined detection surface, without any physical contact and by using the force of an electromagnetic field or infrared rays. Thus, the proximity sensor has a very long lifetime and may be used for various purposes, compared to the tactile sensor.

Examples of the proximity sensor include a transmissive photoelectric sensor, a direct reflective photoelectric sensor, a mirror reflective photoelectric sensor, a high-frequency oscillation proximity sensor, an electrostatic capacitive proximity sensor, a magnetic proximity sensor, an infrared proximity sensor, and so on.

Thus, the sensing unit 110 may sense a gesture or a pattern input by a user. For example, the unit 110 may sense a user's gesture, e.g., dragging, flicking, tapping, touching and holding, double-tapping, panning, or sweeping. In this case, the sensing unit 110 may sense, for example, a direction, speed, and movement length of a gesture.

The memory 120 may store an operating system, applications and other software be executed by the controller 170, data generated during the operation of the operating system and/or programs, input/output data, and so on. Also, the memory 120 may include bezel button mapping information.

The memory 120 may include at least one storage medium from among a flash memory type storage medium, a hard disk type storage medium, a multimedia card micro type storage medium, a card type memory, e.g., a Secure Digital (SD) memory or an eXtreme Digital (XD) memory, a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic disc, and an optical disc memory. Also, the mobile terminal 100 may perform web storage in the Internet, in addition to or as the memory 120.

The first display unit 130 outputs and displays information processed by the mobile terminal 100. For example, the first display unit 130 may display a GUI environment. The GUI environment may correspond to an Operating System (OS) of the mobile terminal 100 or an application executing within the OS of the mobile terminal 100. The first display unit 130 may serve as a primary display of the mobile terminal 100. Also, more than one first display unit 130 may be used according to an implementation of the mobile terminal 100.

The second display unit 140 outputs and displays information processed by the mobile terminal 100. The second display unit 140 may serve as a secondary display of the mobile terminal 100. For example, the second display unit 140 may be disposed at a bezel of the first display unit 130. The second display unit 140 may display indicators, buttons, and/or objects associated with, and/or as a supplement to, the GUI environment displayed on first display 130. The term "button" refers to an item displayed on the second display unit 140 that, when actuated by a user of the mobile terminal 100, causes an action corresponding to a mapped object to be performed. The object is mapped when a user performs a gesture to map an object displayed on the first display unit 130 to be mapped to a button. Alternatively, the object may be pre-mapped to an object. When displayed on the second display unit 140, a button may be displayed as the object, or an image and/or character corresponding to the object. When an object is mapped to a button, the object may no longer be displayed on the first display unit 130.

The second display unit 140 may display a plurality of buttons. The plurality of buttons may be the same size or different sizes. Also, the plurality of buttons may be disposed a preset locations in the second display unit 140 or at any location set by the user. In addition, a plurality of second display units 140 may be used that are each associated with the first display unit 130. When a plurality of second display units 140 are employed, each of the plurality of second display units 140 may display one or more buttons.

If the first display unit 130 and/or second display unit 140, and the touch pad, form a layered structure together to manufacture a touch screen as described above, the first display unit 130 and/or second display unit 140 may be used as not only an output device but also an input device, such as a user input unit which is included in the sensing unit 110. The first display unit 130 and/or second display unit 140 may include at least one from among a Liquid Crystal Display (LCD), a Thin Film Transistor-LCD (TFT-LCD), an Organic Light-Emitting Diode (OLED), a flexible display, a 3-Dimensional (3D) display, an E-Ink display, and so on. The first display unit 130 and second display unit 140 may be implemented with the same or different types of displays. The touch screen may be constructed to sense a location of a touch input, a touched area, and a touched pressure. Also, the touch screen may be constructed to sense not only a real-touch but also a proximity touch.

In the present disclosure, the term 'real-touch' means a case where a pointer actually touches a screen, and the term 'proximity-touch' means a case where a pointer does not actually touch a screen but approaches the screen within a predetermined distance from the screen. In the present disclosure, the term 'pointer' means a tool for touching a particular location on or near a screen. Examples of the pointer include a stylus pen and a finger of a user.

The communication unit 150 may include at least one element for the mobile terminal 100 to communicate with an external device. For example, the communication unit 150 may include a broadcast receiving module, a mobile telecommunication module, a wireless internet module, a wired internet module, a short-range wireless communication module, a location information module, and so on.

The broadcast receiving module receives a broadcast signal and/or information related to a broadcast from an external broadcasting management server (not shown) via a broadcast channel. The broadcast channel may be a satellite channel, a terrestrial broadcast channel, or the like.

The mobile telecommunication module exchanges a radio signal with at least one from among a base station, an external terminal, and a server via a mobile telecommunication network. Examples of the radio signal may include a voice call signal, a video communication call signal, and various types of data needed to exchange a message/multimedia message.

The wireless internet module is a module for accessing the Internet in a wireless manner. The wireless internet module may be installed inside or outside the communication unit 150. The wired internet module is a module for accessing the Internet in a wired manner.

The short-range wireless communication module is a module for establishing a short-range wireless communication. Examples of short-range wireless communication technology may include Bluetooth, Radio Frequency Identification (RFID), Infrared Data Association (IrDA), Ultra WideBand (UWB), ZigBee, and Wi-Fi Direct (WFD), and Near Field Communication (NFC).

The location information module is a module for detecting the location of the mobile terminal 100 or obtaining location information of the mobile terminal 100. A Global Position System (GPS) module is an example of the location information module. The GPS module receives location information of the mobile terminal 100 from a plurality of satellites. Here, the location information may include coordinate information represented with a latitude and longitude.

The button mapping unit 160 may perform some or all of the operations described herein for performing a technique for a programmable button on a bezel of a mobile terminal. Alternatively, the button mapping unit 160 may be omitted. In this case, the operations described herein for performing a technique for a programmable button on a bezel of a mobile terminal may be performed by one or more of the other elements of the mobile terminal 100.

The controller 170 controls overall operations of the mobile terminal 100. For example, the controller 170 performs controlling and processing related to button mapping, voice telecommunication, data communication, video telecommunication, and the like. In other words, the controller 170 may control operations of the sensing unit 110, the memory 120, the first display unit 130, the second display unit 140, the communication unit 150, and the button mapping unit 160.

The controller 170 may include a multimedia module (not shown) for reproducing multimedia content. The multimedia module may be included inside or outside the controller 170.

An example of a technique for a programmable button on a bezel of a mobile terminal is described below with reference to FIG. 2.

Figure 2:
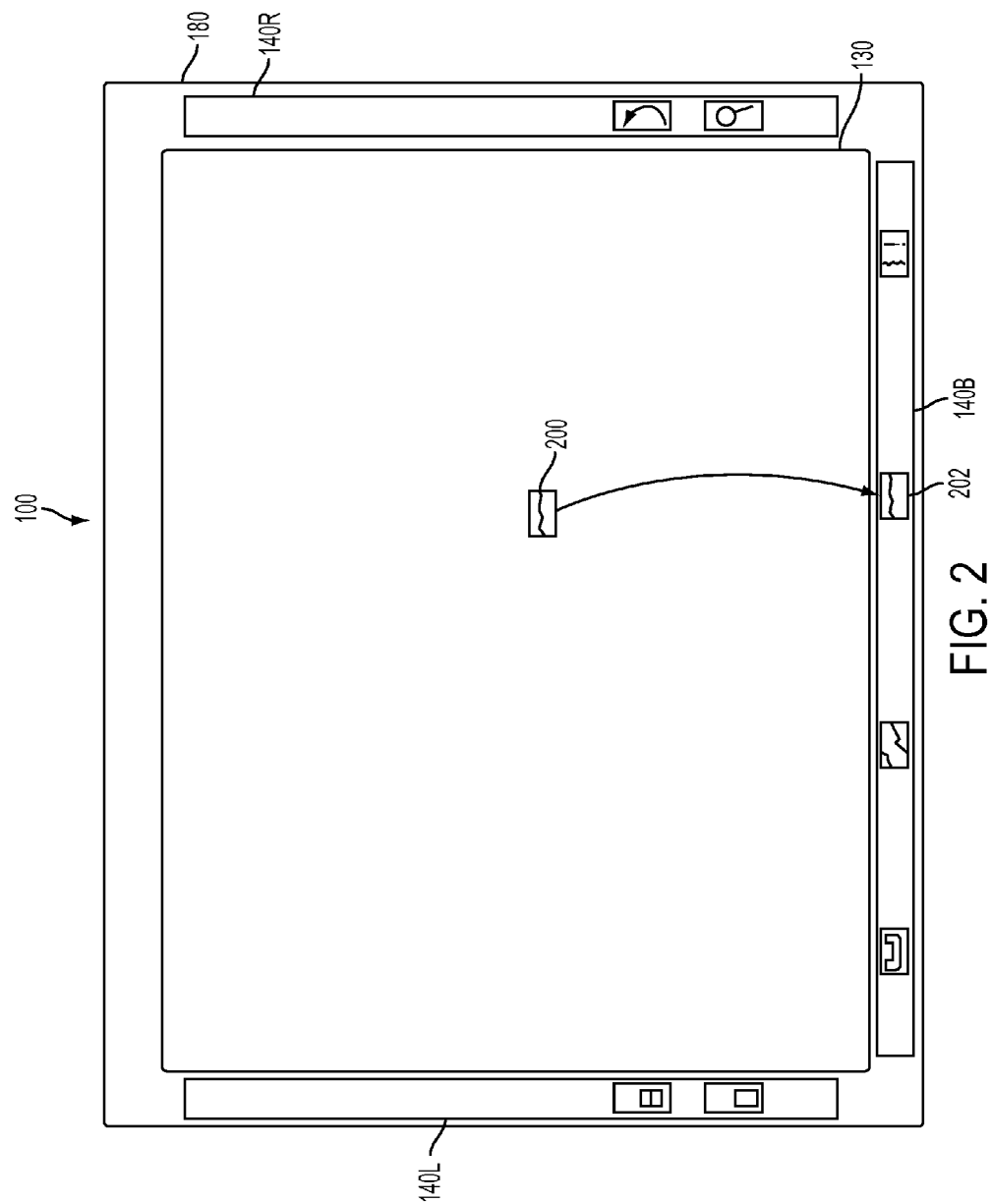
FIG. 2 is a conceptual diagram illustrating a technique for a programmable button on a bezel of a mobile terminal according to an exemplary embodiment of the present invention.

FIG. 2 is a conceptual diagram illustrating a technique for a programmable button on a bezel of a mobile terminal according to an exemplary embodiment of the present invention.

Referring to FIG. 2, a mobile terminal 100 is shown being implemented as a tablet computer for convenience in explanation. However, the present invention is not limited to the mobile terminal 100 being implemented as a tablet computer. That is, the mobile terminal 100 may be implanted as any other device configured to support the technique described herein for a programmable button on a bezel of the device.

The mobile terminal 100 includes the first display 130 and a bezel 180 surrounding the first display 130. A GUI environment is displayed on the first display 130. The bezel 180 includes a bottom second display 140B, a left second display 140L, and a right second display 140R. Here, the first display 130, the bottom second display 140B, the left second display 140L, and the right second display 140R may be part of a single touch screen. Alternatively, each of the first display 130, the bottom second display 140B, the left second display 140L, and the right second display 140R may be part of separate touch screens. In yet another alterative, each of the bottom second display 140B, the left second display 140L, and the right second display 140R may be associated with an input other than a touch screen, such as one or more keys.

In the present exemplary embodiment, each of the bottom second display 140B, the left second display 140L, and the right second display 140R may be populated with a plurality of buttons of preset sizes at preset locations. As described above, a button may cause an action to be performed when the button is actuated by the user. Alternatively, a button may serve as a visual indicator that indicates a state of an application, or the mobile terminal 100, to the user.

The buttons may be associated with the GUI environment and/or the operation of the mobile terminal 100. For example, the buttons may correspond to functions or data of an application running on the mobile terminal 100. Likewise, the buttons may correspond to functions or data of the mobile terminal 100.

As can be seen in FIG. 2, various buttons are mapped to each of the bottom second display 140B, the left second display 140L, and the right second display 140R. Also, FIG. 2 shows the mapping of object 200 displayed in the first display 130 to a button 202 on the bottom second display 140B. The mapping may be preset or may be user configurable. When the mapping is user configurable, the mapping is performed when a user performs a gesture, such as a dragging of the object 200 to, and then the dropping the object 200 at, the location of the button 202. Here is assumed that the button 202 is vacant. The movement of the object 200 may be shown on the first display 130. Once the user drops the object 200 at the location of the button 202, the button 202 is mapped to the object 200 and the button 202 is thereafter displayed in the corresponding location in the bottom second display 140B. The button mapping may be stored in a memory 120. Also, once the button 202 is mapped to the object 200, the object 200 may no longer be displayed in the first display 130. When the user drops the object 200 in the bottom second display 140B, the closest preset location for a button to where the user drops the object 200 may be determined to be the location for the button 202.

When the user drops the object 200, when the button 202 is already mapped to another object, one of a plurality of different actions may be taken. In one case, the closest available button location may be used. In another case, the object already mapped to the button 202 may be unmapped and then the object 200 may be mapped to the button 202. In this case, the unmapped object may be displayed by the first display 130. In yet another case, the object already mapped to the button 202 may be remapped to another button displayed by the bottom second display 140B. In still another case, the button 202 may correspond to a folder. In this case, the button 202 becomes a button for a folder that includes the object that was already mapped to the button 202 and the object 200. Here, when the button 202 corresponds to a folder and the button 202 is actuated by the user, the buttons of the folder may be displayed on at least one of the first display 130, the bottom second display 140B, the left second display 140L, and the right second display 140R.

Once the object is mapped to the second display 140, the object, or a representation thereof, is displayed on the second display 140 at the mapped location. The display of the buttons may remain the same regardless of what is being displayed on the first display 130, regardless of what is being executed by the mobile terminal 100, or regardless of the state of the mobile terminal 100. Alternatively, the display of the buttons may change dependent upon at least one of what is being displayed on the first display 130, what is being executed by the mobile terminal 100, or the state of the mobile terminal 100.

While the object 200 is displayed on the second display 140 as button 202, the user may perform a gesture to select the button 202. For example, the user may perform one of a tapping, a touching and holding, a double-tapping, or the like to select the button. Upon the button being selected by the user, an action corresponding to the object 200 mapped to button 202 may be performed.

An exemplary implementation of the mobile terminal for the technique for a programmable button on a bezel is described below with reference to FIG. 3.

Figure 3:
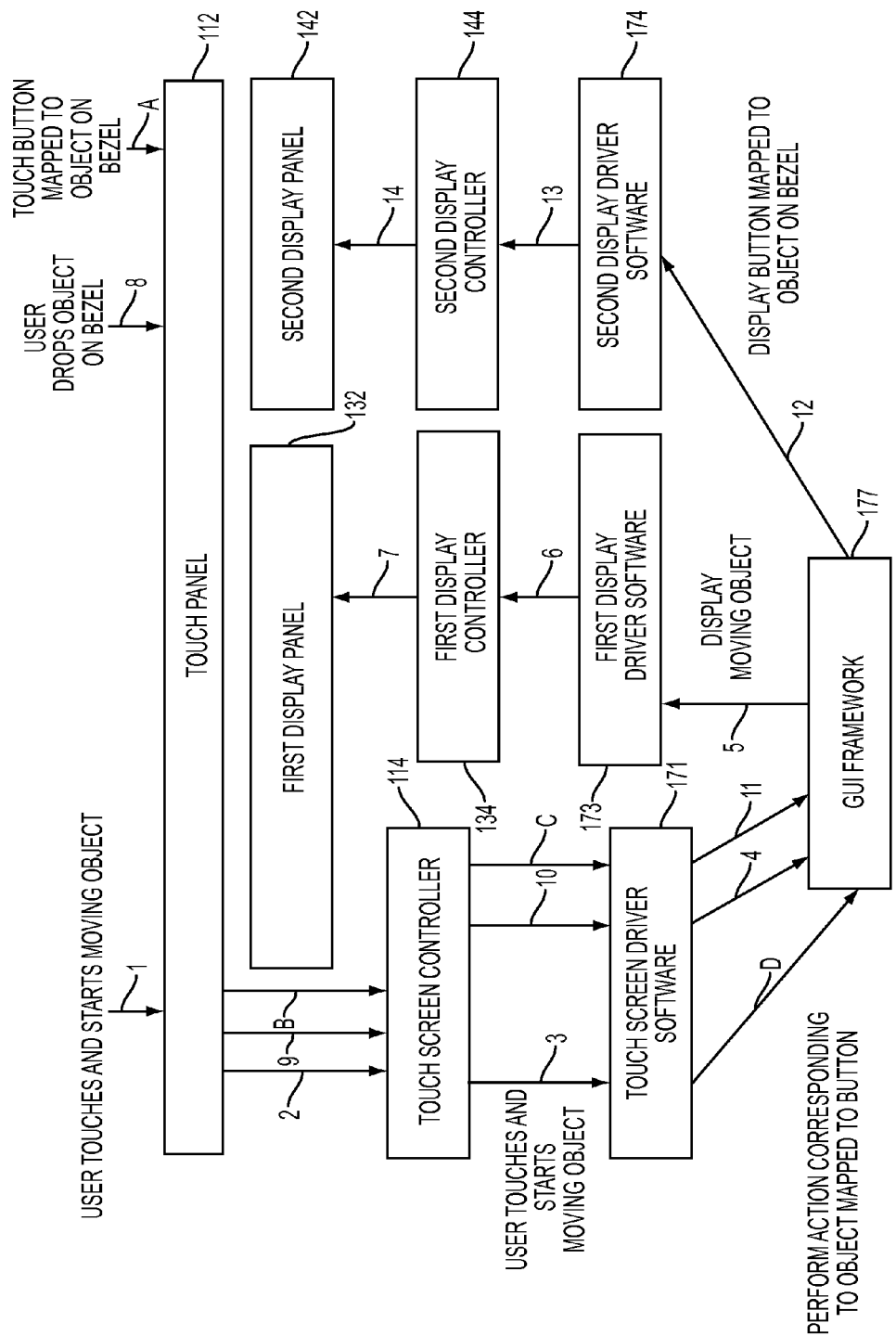
FIG. 3 is a block diagram illustrating a configuration of a mobile terminal according to an exemplary embodiment of the present invention.

FIG. 3 is a block diagram illustrating a configuration of a mobile terminal according to an exemplary embodiment of the present invention.

In FIG. 3, the mobile terminal 100 is shown as being implemented with the sensing unit 110, the first display 130, and the second display 140 forming a single touch screen. However, the present invention is not limited to the sensing unit 110, the first display 130, and the second display 140 forming a single touch screen.

Referring to FIG. 3, the sensing unit 110 (not shown in FIG. 3) may include a touch panel 112 and a touch screen controller 114. The first display 130 (not shown in FIG. 3) may include a first display panel 132 and a first display controller 134. The second display 140 (not shown in FIG. 3) may include a second display panel 142 and a second display controller 144. The controller 170 may execute software stored in the memory 120. The software executed by the controller 170 may include a touch screen driver software 171, a first display driver software 173, a second display driver software 174, and a GUI Framework 177.

An operation of mapping a button on a bezel is described below with reference to FIG. 3. When a user desires to map an object to a location on the bezel, the user may perform a dragging and dropping operation. In particular, when the user touches the touch panel 112 at a location corresponding to an object displayed on the first display panel 132 (1), the touch panel 112 sends a corresponding electrical signal to the touch screen controller 114 (2). As the user holds and moves the touch, the touch panel 112 senses the user's movement on the touch panel 112 and continues to send a corresponding electrical signal to the touch screen controller 114. Once the user releases the touch (8), the touch panel 112 discontinues sending an electrical signal to the touch screen controller 114 (9).

Based on the electrical signals received from the touch panel 112, the touch screen controller 114 determines the initial touch location, location as the touch is moving, and the touch release location. The touch screen controller 114 sends information regarding the initial touch location (3), movement (3), and touch release location (10) to the controller 170 for processing by the touch screen driver software 171.

The touch screen driver software 171, based on the information regarding the initial touch location, movement, and touch release location, determines that a touch occurred at the location of the object, that the object was dragged according the movement, and that the object was dropped at a location corresponding to the touch release location. The touch screen driver software 171 informs (4 and 11) the GUI Framework 177 of the drag and drop of the object while the drag and drop is occurring. Meanwhile, the GUI Framework 177 instructs (5) the first display driver software 173 to control (6) the first display panel controller 134 to display (7) the object at a location on the first display panel 132 corresponding to the detected location of the touch. Thus, movement of the object corresponding to the movement of the touch is displayed.

Once the touch corresponds to a location on the second display panel 142, the GUI Framework 177 instructs (12) the second display driver software 174 to control (13) the second display controller 144 to display (14) the object at a location on the second display panel 142 corresponding to the detected location of the touch. When the drop occurs at a location on the second display panel 142, the GUI Framework 177 stores a mapping of the object to the corresponding location in the second display panel 142 in memory 120, and instructs (12) the second display driver software 174 to continue to control (13) the second display controller 144 to display (14) a button corresponding to the object at the location on the second display panel 142 corresponding to the detected location of the drop.

An operation of actuating a button on a bezel is described below with reference to FIG. 3. When a user desires to actuate a button on the second display panel 142, the user may perform one of a tapping, a touching and holding, a double-tapping, or the like to select a button. In particular, when the user touches (A) the touch panel 112 at a location corresponding to the button on the second display panel 142, the touch panel 112 sends a corresponding electrical signal (B) to the touch screen controller 114.

Based on the electrical signal received from the touch panel 112, the touch screen controller 114 determines the touch location. The touch screen controller 114 sends information (C) regarding the touch location to the controller 170 for processing by the touch screen driver software 171.

The touch screen driver software 171, based on the information regarding the touch location, determines that a touch occurs at the location of the button. The touch screen driver software 171 informs (D) the GUI Framework 177 of the actuation of the button. Thereafter, the GUI Framework 177 performs an action corresponding to object mapped to the button.

A method for mapping a button on a bezel of a mobile terminal is described below with reference to FIG. 4.

Figure 4:
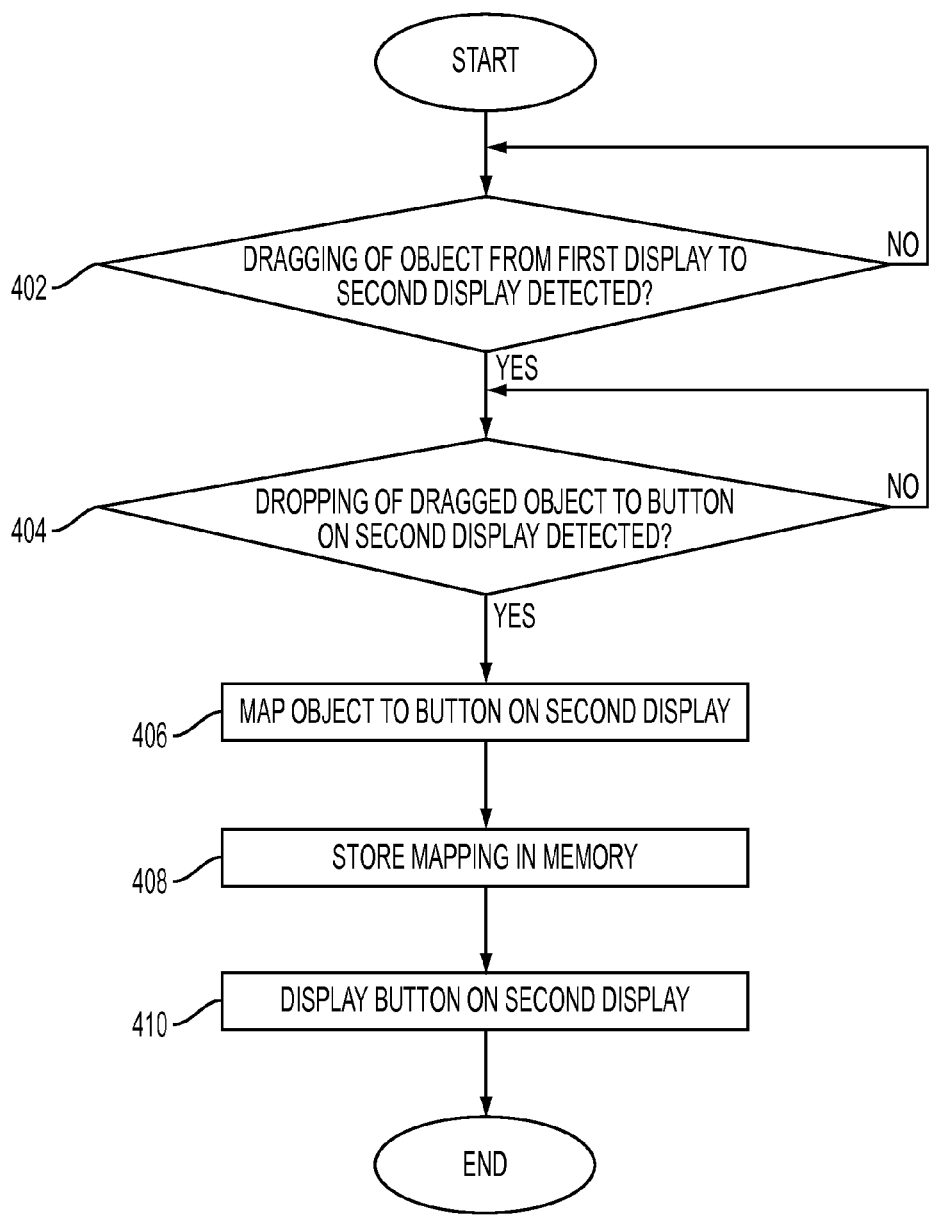
FIG. 4 is a flowchart illustrating a method for mapping a button on a bezel of a mobile terminal according to an exemplary embodiment of the present invention.

FIG. 4 is a flowchart illustrating a method for mapping a button on a bezel of a mobile terminal according to an exemplary embodiment of the present invention.

Referring to FIG. 4, in step 402, a dragging of an object displayed on the first display to the at least one second display is detected. In step 404, a dropping of the dragged object to the button on the at least one second display is detected. In step 406, the object is mapped to the button on the at least one second display. In step 408, the mapping is stored in memory. In step 410, the button is displayed on the at least one second display.

A method for operating button on a bezel of a mobile terminal is described below with reference to FIG. 5.

Figure 5:
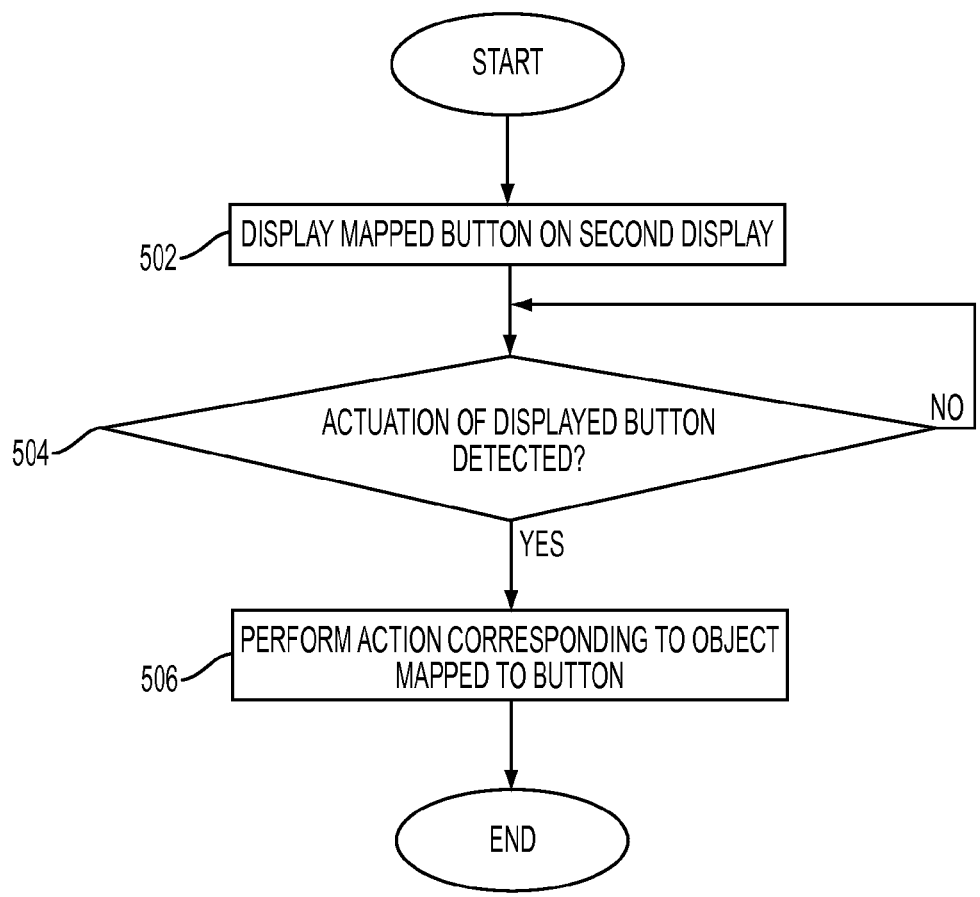
FIG. 5 is a flowchart illustrating a method for operating button on a bezel of a mobile terminal according to an exemplary embodiment of the present invention.

FIG. 5 is a flowchart illustrating a method for operating button on a bezel of a mobile terminal according to an exemplary embodiment of the present invention.

Referring to FIG. 5, in step 502, a mapped button is displayed. In step 504, an actuation of the displayed button is detected. In step 506, an action corresponding to an object to which the button is mapped is performed.

At this point it should be noted that the exemplary embodiments of the present disclosure as described above typically involve the processing of input data and the generation of output data to some extent. This input data processing and output data generation may be implemented in hardware, or software in combination with hardware. For example, specific electronic components may be employed in a mobile device or similar or related circuitry for implementing the functions associated with the exemplary embodiments of the present invention as described above. Alternatively, one or more processors operating in accordance with stored instructions (i.e., code) may implement the functions associated with the exemplary embodiments of the present invention as described above. If such is the case, it is within the scope of the present disclosure that such instructions may be stored on one or more non-transitory processor readable mediums. Examples of the non-transitory processor readable mediums include ROM, RAM, Compact Disc (CD)-ROMs, magnetic tapes, floppy disks, and optical data storage devices. The non-transitory processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a programmable button on a bezel of a mobile terminal, the mobile terminal comprising a touch sensor, a first display and at least one second display disposed at the bezel, the bezel at least partially surrounding the first display, the method comprising:
   mapping an object displayed on the first display to a display portion of the at least one second display, which is represented as a button on the at least one second display;
   storing the mapping of the object to the display portion of the at least one second display;
   displaying a second object as the button on the display portion of the at least one second display, the displayed second object corresponding to the object displayed on the first display; and
   when the displayed button is actuated, performing an action corresponding to the object.

2. The method of claim 1, wherein the mapping of the object displayed on the first display to the display portion of the at least one second display comprises:
   detecting a dragging of the object displayed on the first display to the at least one second display;
   detecting a dropping of the dragged object to the display portion of the at least one second display; and
   mapping the object to the display portion of the at least one second display.

3. The method of claim 2, wherein the object is displayed on the first display as it is dragging on the first display.

4. The method of claim 2, wherein the detecting of the dropping of the dragged object to the display portion of the at least one second display comprises:
   detecting a closest one of a plurality of fixed locations corresponding to button locations as a location for the display portion to which the object is dropped.

5. The method of claim 1, wherein the displayed button is actuated when one of a tapping, a touching and holding, and a double-tapping is detected at a location corresponding to the displayed button.

6. The method of claim 1, wherein the mobile terminal comprises at least one of a mobile phone, a smartphone, a tablet computer, a laptop computer, a notebook computer, a digital broadcasting terminal, a Personal Digital Assistant (PDA), a Portable Multimedia Player (PMP), a navigation device, a monitor, a TeleVision (TV), a digital Consumer Electronics (CE) device, a Digital TeleVision (DTV), an Internet Protocol TV (IPTV), a refrigerator with a display device, an air conditioner with a display device, and a printer with a display device.

7. The method of claim 1, wherein each of the at least one second display is configured to display a plurality of buttons.

8. The method of claim 1, wherein each of the at least one second display is configured to display one button.

9. The method of claim 1, wherein, once the object is mapped to the display portion of the at least one second display, the object is not displayed on the first display.

10. The method of claim 1, wherein the first display displays a Graphical User Interface (GUI) environment and the at least one second display only displays one or more buttons.

11. The method of claim 1, wherein the touch sensor, the first display and the at least one second display form a touch screen.

12. A mobile terminal, the terminal comprising:
    a touch sensor configured to detect a touch;
    a first display configured to display an object;
    at least one second display disposed at a bezel, the bezel at least partially surrounding the first display;
    at least one controller configured to control the touch sensor, the first display and the at least one second display, to map the object displayed on the first display to a display portion of the at least one second display, which is represented as a button on the at least one second display, to control to display a second object as the button on the display portion of the at least one second display, the displayed second object corresponding to the object displayed on the first display, and to, when the displayed button is actuated, perform an action corresponding to the object; and
    a memory configured to store the mapping of the object displayed on the first display to the display portion of the at least one second display.

13. The terminal of claim 12, wherein the at least one controller is further configured to detect a dragging of the object displayed on the first display to the at least one second display, to detect a dropping of the dragged object to the display portion of the at least one second display, and to map the object to the display portion of the at least one second display.

14. The terminal of claim 13, wherein the at least one controller is further configured to control to display the object on the first display as it is dragging on the first display.

15. The terminal of claim 13, wherein the least one controller is further configured to detect a closest one of a plurality of fixed locations corresponding to button locations as a location for the display portion to which the object is dropped.

16. The terminal of claim 12, wherein the displayed button is actuated when one of a tapping, a touching and holding, and a double-tapping is detected at a location corresponding to the displayed button.

17. The terminal of claim 12, wherein the terminal comprises at least one of a mobile phone, a smartphone, a tablet computer, a laptop computer, a notebook computer, a digital broadcasting terminal, a Personal Digital Assistant (PDA), a Portable Multimedia Player (PMP), a navigation device, a monitor, a TeleVision (TV), a digital Consumer Electronics (CE) device, a Digital TeleVision (DTV), an Internet Protocol TV (IPTV), a refrigerator with a display device, an air conditioner with a display device, and a printer with a display device.

18. The terminal of claim 12, wherein each of the at least one second display is configured to display a plurality of buttons.

19. The terminal of claim 12, wherein each of the at least one second display is configured to display one button.

20. The terminal of claim 12, wherein, once the object is mapped to the display portion of the at least one second display, the object is not displayed on the first display.

21. The terminal of claim 12, wherein the first display displays a Graphical User Interface (GUI) environment and the at least one second display only displays one or more buttons.

22. The terminal of claim 12, wherein the touch sensor, the first display and the at least one second display form a touch screen.

23. The terminal of claim 12, further comprising:
a bottom second display disposed at a bottom portion of the bezel;
a left second display disposed at a left portion of the bezel; and
a right second display disposed at a right portion of the bezel.

* * * * *